United States Patent
Kumar et al.

(10) Patent No.: US 9,534,476 B2
(45) Date of Patent: Jan. 3, 2017

(54) SCALE-INHIBITING COATING

(71) Applicants: Deepak Kumar, Houston, TX (US); Zhiyue Xu, Cypress, TX (US)

(72) Inventors: Deepak Kumar, Houston, TX (US); Zhiyue Xu, Cypress, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 415 days.

(21) Appl. No.: 14/090,070

(22) Filed: Nov. 26, 2013

(65) Prior Publication Data

US 2015/0147495 A1 May 28, 2015

(51) Int. Cl.
| | |
|---|---|
| *E21B 41/02* | (2006.01) |
| *E21B 17/10* | (2006.01) |
| *E21B 41/00* | (2006.01) |
| *E21B 17/00* | (2006.01) |
| *B32B 1/08* | (2006.01) |
| *B32B 1/02* | (2006.01) |
| *C09K 8/528* | (2006.01) |

(52) U.S. Cl.
CPC ............ *E21B 41/02* (2013.01); *B32B 1/02* (2013.01); *B32B 1/08* (2013.01); *C09K 8/528* (2013.01); *E21B 17/00* (2013.01); *E21B 17/10* (2013.01); *E21B 41/00* (2013.01); *C09K 2208/32* (2013.01); *Y10T 428/13* (2015.01); *Y10T 428/1317* (2015.01); *Y10T 428/1393* (2015.01); *Y10T 428/30* (2015.01)

(58) Field of Classification Search
CPC ........ E21B 41/00; E21B 17/00; E21B 17/10; E21B 17/1085; E21B 41/02; Y10T 428/131; Y10T 428/1317; Y10T 428/139; Y10T 428/1393; B32B 1/02; B32B 1/08
See application file for complete search history.

(56) References Cited

U.S. PATENT DOCUMENTS

| | | | |
|---|---|---|---|
| 6,447,891 B1 | 9/2002 | Veerasamy et al. | |
| 2002/0032073 A1* | 3/2002 | Rogers | A63B 53/04 473/324 |
| 2004/0069466 A1 | 4/2004 | Blangetti et al. | |
| 2007/0028588 A1 | 2/2007 | Varanasi et al. | |
| 2010/0206553 A1 | 8/2010 | Bailey et al. | |
| 2011/0162751 A1 | 7/2011 | Fitzgerald et al. | |
| 2011/0220348 A1* | 9/2011 | Jin | E21B 17/042 166/244.1 |
| 2015/0147523 A1 | 5/2015 | Kumar et al. | |

OTHER PUBLICATIONS

Damasceno et al., "Deposition of Si-DLC films with high hardness, low stress, and high deposition rates", Surface and Coating Technology, vol. 133-134, Nov. 2000, pp. 247-252.

(Continued)

*Primary Examiner* — Walter B Aughenbaugh
(74) *Attorney, Agent, or Firm* — Cantor Colburn LLP

(57) ABSTRACT

Disclosed is a coating for inhibiting the formation of scales on one or more surfaces of a component used in the production of subsurface fluids. The coating comprises a diamond-like carbon structure doped with a dopant, such as silicon, titanium, fluorine, oxygen, or chromium. The dopant comprises between about 10% and about 40% of the coating by atom.

23 Claims, 3 Drawing Sheets

(56) References Cited

OTHER PUBLICATIONS

Kumar et al., "Reduction in Scale Build-up from Sub-surface Safety Valve Using Hydrophobic Material Coating", ATCE 2013, SPE Annual Technical Conference and Exhibition, Sep. 30-Oct. 2, 2013, pp. 1-25.

Kumar et al., "Reduction in Scale Build-up from Sub-surface Safety Valve Using Hydrophobic Material Coating", Society of Petroleum Engineers, 2013, pp. 1-15.

Quere et al., "Non-adhesive lotus and other hydrophobic materials", Philosophical Transactions of the Royal Society A, 366, 1539-1556 (2008).

Roy et al., "Hemocompatibility of surface modified, silicon-incporporated, diamond carbon films", Acta Biomaterilia, 5 (1), 2009 p.n. 249-256.

Stojanovic et al., "Micropatterning of superhydrophobic silicone nano-filaments by a near ultraviolet Nd:YAG laser", nano Res. 3 (12), 889-894 (2010).

\* cited by examiner

SCALE-INHIBITING COATING

BACKGROUND

Many articles used in industry are exposed to harsh environments. For example, tools used in a wellbore or other downhole environment in the drilling industry are often exposed to corrosive fluids, which may cause hard scales of inorganic or organic compounds such as $CaCO_3$, $BaSO_4$, $CaSO_4$, $SrSO_4$, and asphaltene to build up on the surfaces of the articles. These compounds may, for example, exist in the form of colloidal dispersions stabilized by other components in the subsurface fluid. They will often precipitate upon pressure, temperature, and compositional changes in the oil resulting from blending or other mechanical or physicochemical processing. Such precipitation occurs in pipelines, separators, and other equipment. Once deposited, scales can interfere with the normal function of the articles and cause disruption to the system and/or process in which the articles are used and may necessitate repairs or replacements. Exploration and production companies presently use remediation tools, such as abrasive jets and mechanical tools, to remove the scales. However, the techniques require costly well intervention, add up to non-productive time, and are sometimes not feasible. Accordingly, an alternative method of preventing scale-related fouling or lengthening equipment uptime through scale minimization is continuously sought.

SUMMARY

Disclosed herein is a scale-inhibiting coating a coating applied to a substrate. The coating comprises a diamond-like carbon structure doped with a dopant. The coating includes the dopant at a concentration of between about 10 and about 40 atomic percent.

Also disclosed herein is a scale-inhibiting coating deposited on one or more surfaces of the article. The coating comprises a diamond-like carbon structure doped with a dopant. The coating includes the dopant at a concentration of between about 10 and about 40 atomic percent.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures. It is to be understood that other embodiments may be utilized and changes may be made without departing from the scope of the present disclosure. In particular, the disclosure provides various examples related to a subsurface safety valve, whereas the advantages of the present disclosure as applied to other devices or to devices in a related field would be apparent to one having ordinary skill in the art and are considered to be within the scope of the present invention.

Figure 1:
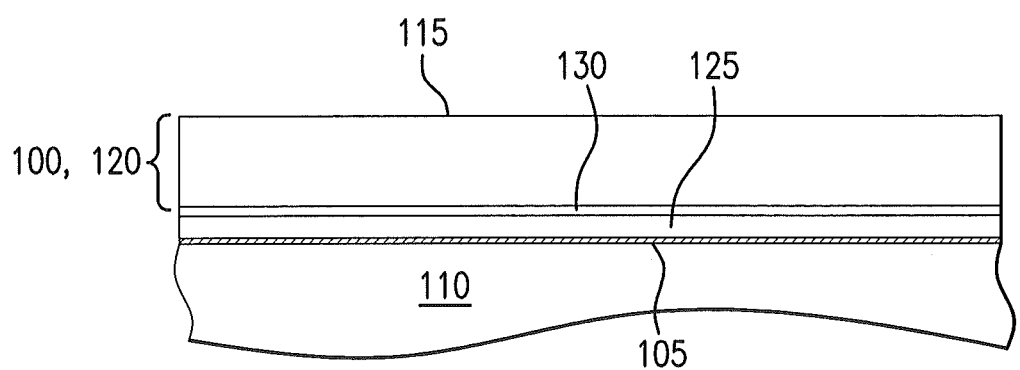
FIG. 1 is a sectioned side view of a coated surface according to one embodiment.

Referring to FIG. 1, the present disclosure provides a coating 100 applied to a surface 105 of an article 110. The article 110 is a device used in the production of a subsurface fluid. As used herein, the term "production," as far as it applies to subsurface fluids, is defined to include all activities related to the extraction, conveyance, and distribution of the fluid, up to and including processing or refining the fluid. The subsurface fluid is a substance obtained from a subterranean formation and may comprise a liquid, a gas, a mixture containing solids and/or gases suspended in a liquid, a mixture containing solids and/or liquids in a gaseous stream, or any combination of the foregoing. For example, the subsurface fluid may comprise crude oil in liquid form, a brine, natural gas, a slurry containing a sedimentary substance, etc. As used herein, the terms "hydrocarbon," "hydrocarbons," or "hydrocarbon fluid" shall be construed as inclusive of crude oil, natural gas, and all other hydrocarbon products that may be obtained from subterranean sources, whether liquid, gaseous, or semi-solid.

The coating 100 of the present disclosure inhibits scaling that typically results from prolonged exposure to circulating fluids, including hydrocarbons and other subsurface fluids, such as water or a brine obtained from a well. As used herein, the term "scaling" shall be inclusive all forms of deposits that accumulate on the surface 105 of an article 110 due to compounds contained in the subsurface fluid, including those deposits which could potentially restrict the flow of fluid across the associated surface 105.

The coating 100 comprises an outer surface 115, opposite the substrate, that is hydrophobic. The coating 100 may exhibit other advantageous qualities. In some embodiments, this includes treating the outer surface 115 of the coating 100 to be oleophobic as well as hydrophobic. The coating 100 of the present disclosure is also resistant to abrasion and very durable in the presence of subsurface fluids. These qualities of abrasion-resistance and durability ensure that the article will continue to perform over the intended lifespan of the article. The coating 100 of the present disclosure inhibits scaling that typically results from prolonged exposure to circulating fluids, including hydrocarbons and other subsurface fluids, such as water or a brine obtained from a well.

The coating 100 of the present disclosure comprises a diamond-like carbon structure 120 that is doped with a dopant. Diamond-like carbon, also known as amorphous carbon, is termed "diamond-like carbon" because it exhibits many of the properties of diamond, including tribological properties. The diamond-like carbon structure 120 of the present disclosure is formed having an amorphous crystalline structure. For example, the diamond-like carbon structure 120 contains both sp2 bonds, (similar to the planar bonds found in graphite), and sp3 bonds, (similar to the tetrahedral bonds found in diamond). In some embodiments, the diamond-like carbon structure 120 contains between about 60 percent and about 90 percent of sp2 bonded carbon.

The inclusion of the dopant in the diamond-like carbon structure 120 enhances the properties of the diamond-like structure in inhibiting scaling. For example, the inclusion of fluorine or silicon as a dopant significantly increases the hydrophobicity of the coating 100. Other dopants can be included which enable the coating 100 to bond to the surface 105 of the article 110. For example, the dopant may be selected to include a material to match the resulting thermal expansion of the coating 100 to the thermal expansion of the article 110 over a selected temperature range. In various embodiments the dopant may comprise a metal or metalloid element, such as silicon, titanium, chromium, fluorine, oxygen, or a mixture of these. The dopant may further include other metals to improve the adhesion and/or the performance of the coating 100. The diamond-like carbon structure 120 may contain the dopant at a concentration of between about 10 to about 40 atomic percent. In one embodiment, the dopant comprises about 30 atomic percent of the coating 100. The distribution of the dopant within the diamond-like carbon structure 120 may further enhance the properties of the coating 100. Applicants have found that a coating comprising an amorphous diamond like carbon doped with 10 to 40 atomic percent of Si (silicon), O (oxygen), F (fluorine), or a combination comprising at least one of the foregoing can significantly increase the hydrophobicity and oleophobicity of a surface. For example, the coating increased the hydrophobicity of a steel surface by about 33% (from 70 degrees to 93 degrees).

Moreover, unlike other available hydrophobic/oleophobic coatings such as fluoropolymer, fluoropolymer containing composites and graphite-$MoS_2$, the coating comprising an amorphous diamond like carbon doped with 10 to 40 atomic percent of Si, O (oxygen), F, or a combination comprising at least one of the foregoing has good corrosion resistance. For example, in a laboratory test the coating's chemical and mechanical properties remain intact after the aging is conducted at 300° F./1000 psi in 3% KCl brine, whereas those of fluoropolymer noticeably degraded.

In addition to a doped diamond-like carbon structure 120, a low surface energy material can also be coated on a textured surface described herein. Low surface energy materials include fluoropolymers, silicones, ceramic, fluoropolymer containing composites, or combinations comprising at least one of the foregoing. Exemplary low surface energy materials include polytetrafluoroethylene with or without reinforcements, polydimethylsiloxane, graphite/$MoS_2$ type ceramic materials, and metal-PTFE composites. The low surface energy material can be applied to the textured surface by any method known in the art, for example, by spray coating, dip-coating, thermal evaporation coating or electrolytic or electroless coating techniques. Fluoropolymer are materials containing multiple carbon-fluorine bonds. Typical examples of commercial fluoropolymer are polytetrafluoroethylene, fluorinated ethylene propylene, and perfluoroalkoxy.

The diamond-like carbon structure 120 may be applied directly to the surface 105 of the article 110. Alternatively, a bonding layer 125 may be formed beneath the diamond-like carbon structure 120, adjacent to the surface 105 of the article to reduce the internal stresses on the diamond-like carbon structure 120. The bonding layer 125 may comprise, for example, pure chromium, a silicon-metal, or another substance or mixture of elements that is advantageous for a particular application. The thickness of the bonding layer 125 may be between about 0.05 microns and about 0.5 microns. The bonding layer 125 may be applied using physical vapor deposition (PVD), chemical vapor deposition (CVD), plasma-enhanced chemical vapor deposition, cold spray, or another technique known in the art.

The surface 105 of the article 110 or the surface of the bonding layer 125 may further be formed into a textured surface 130 to enhance the bonding with the diamond-like carbon structure 120. The coating can be applied to a textured surface 130 having micro-meter size structures or micro and nano-meter size structures. Applicants have found that when the coating is applied to a surface having certain textures, the hydrophobicity and the oleophobicity of the coating can be greatly increased. For example, surface textures can increase the hydrophobicity of the coating by greater than 30%, greater than 40%, or even greater than 50%, as determined by comparing the contact angle of water with the coating on a surface without any texture and the contact angle of water with the same coating on a surface having textures. Further, the water and oil roll-off angles of the coating on the textured surface can also be lower as compared to the same coating applied on a surface without texture.

The textured surface 130 may comprise a micro texture, a micro-nano texture, or a combination of a micro texture and a micro-nano texture. As used herein, a "micro texture" refers to a texture having micro-meter size structural features. A "micro-nano texture" refers to a texture having nano-meter size structural features superimposed on micro-meter size structural features. The micro and micro-nano texturing is provided in the form of periodic and/or non-periodic arrays of micro- and nano-meter size protrusions, holes, particles, pits, grooves, trenches, pillars, peaks, craters, cones, bumps, or other surface features. The textured surface 130 may be formed, for example, by chemical etching, laser ablation, sand-blasting, or another method as desired. Alternatively, the textured surface 130 may be formed by sputtering a material or nanostructure onto the textured surface 130.

The coating 100 may be formed using a variety of processes. These include, for example, physical vapor deposition (PVD), chemical vapor deposition (CVD), plasma-enhanced chemical vapor deposition, primary ion beam deposition of carbon ions (IBD), closed field unbalanced magnetron sputtering, and other methods known in the art and currently being developed.

In some embodiments, depositing the diamond-like carbon structure 120 comprises vapor deposition. A "vapor deposition" process refers to a process of depositing materials on a substrate through the vapor phase. Vapor deposition processes include physical vapor deposition and chemical vapor deposition. Different variations of physical deposition and chemical deposition can be used. Exemplary deposition processes can include plasma assisted chemical vapor deposition, sputtering, ion beam deposition, laser ablation, or thermal evaporation. In an embodiment, the doped amorphous carbon is deposited by plasma ion immersion implantation and deposition. The gaseous medium for the vapor deposition can be 100% hexamethyldisiloxane or a mixture of tetramethylsilane and $C_2H_2$ gases for Si or a combination of Si and O (oxygen) doped amorphous diamond like carbon. For fluorine doped amorphous diamond like carbon, the gaseous medium is a mixture of $C_2H_2$ and $C_2F_4$ gases. Alternatively, the dopant is supplied in a compound, such as an oxide, a nitride, or a chloride compound.

The coating 100 may be applied with the diamond-like carbon and the dopant supplied in the same stream. Alternatively, the dopant may be applied intermittently during the process. Where necessary, such as where the material is provided in aggregate form, the diamond-like carbon and dopant will need to be mixed in order to ensure a largely homogenous structure. Different byproducts formed depend upon the constituents used to supply the carbon and the dopant. Some other elements may also be incorporated into the structure. For example, the diamond-like carbon structure 120 of the present disclosure may contain hydrogen. Hydrogen may be included in the structure at a concentration of between about 10% and about 25% by atom.

The diamond-like carbon structure 120 may also be manipulated using heat and/or pressure during and/or after the application process. The application of high pressures and heat is used to further enhance the properties of the coating 100 by influencing the ratio of sp2 and sp3 bonds.

Typically, the application of pressure increases the number of sp3 bonds. The presence of silicon may also increase the number of sp3 bonds. Diamond-like carbon structures with a high ratio of sp3 bonds are known to have a lower surface energy. Other properties, however, including hydrophobicity, hardness, smoothness, and contact angle hysteresis also significantly influence the ability of the coating 100 to inhibit scaling. For example, in some embodiments, the resulting coating 100 has a contact angle hysteresis of less than or equal to about 10°. This property is affected by the composition of the dopant, the crystallization structure, (the ratio of sp2 and sp3 bonds), and may be negatively affected by roughness on the outer surface 115.

In one embodiment of the present disclosure, the coating 100 is formed with a silicon dopant at a concentration by atom of about 30%. The coating 100 also contains some hydrogen. The diamond-like carbon structure 120 is processed using heat and pressure to contain between about 60% and about 90% sp2 bonded carbon. The structure contains between about 10% and about 40% sp3 bonded carbon. The resulting coating 100 is durable and abrasion-resistant. The coating 100 of this embodiment is also successful at inhibiting the formation of scales in the presence of subsurface fluids, such as hydrocarbons.

In some embodiments, the coating 100 is formed having a thickness of about 15 microns or less, or of about 10 microns or less. Larger thicknesses are also possible, but may in some instances require the reconfiguration of the article 110 to account for the thickness of the coating 100.

The coating 100 can be applied selectively to a surface of an article, to an entire article, or to a plurality of articles forming an apparatus or system. In the production of hydrocarbons this may include, for example, a subsurface safety valve, a flow control valve, a production tubing, a biasing member, or a sleeve. The coating can be applied to internal, external, or both the internal and the external surfaces of articles such as the inner wall tube, pipe, safety valve, or flow control valves as an anti-scale, anti-deposition, low-friction, and/or anti-corrosion coating. In an embodiment, a coated article comprises the doped amorphous diamond like carbon disposed on an un-textured or textured surface of the article.

Figure 2A:
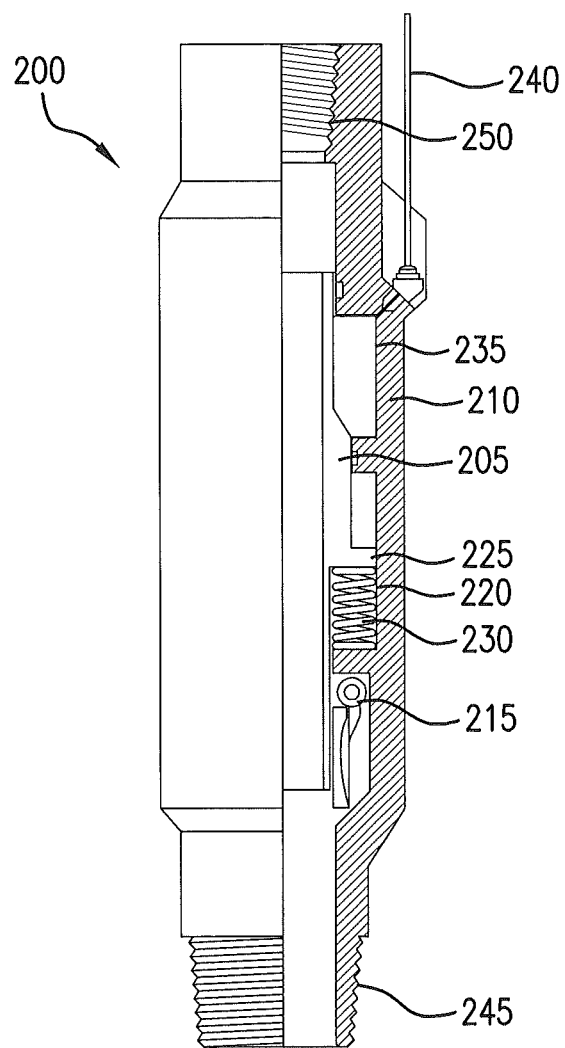
FIGS. 2A and 2B are partially sectioned side views of a subsurface safety valve shown in open and closed positions, respectively, according to another embodiment.
Figure 2B:
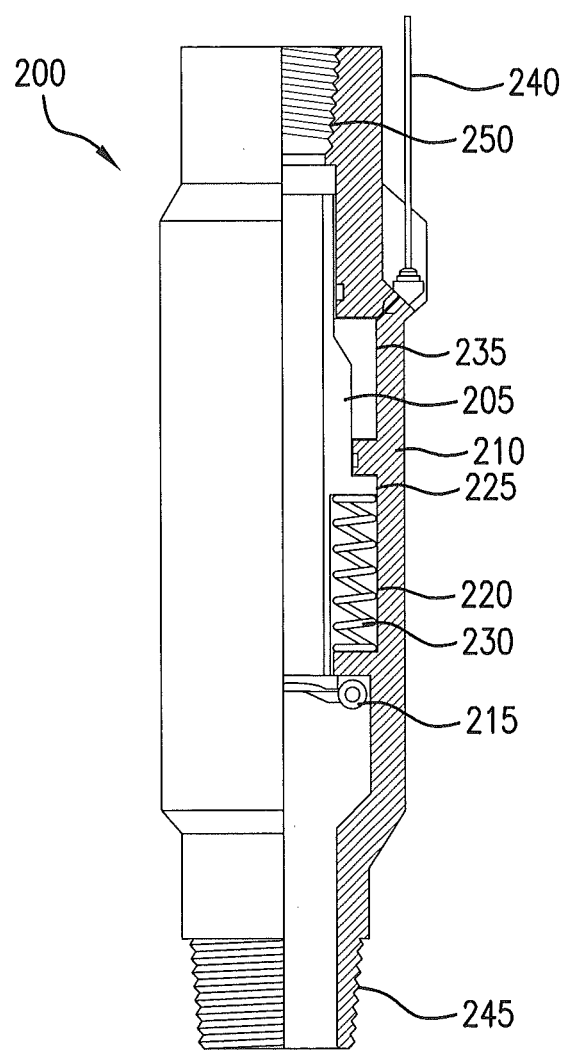

FIGS. 2A and 2B illustrate an embodiment where the coating described above is applied to one or more surfaces in a subsurface safety valve 200. The subsurface safety valve 200 comprises several components, including a flow tube 205 located within a housing 210. At one end of the flow tube 205 is an obstruction member 215, which may comprise a flapper configured to open or close depending upon the position of the flow tube 205.

The flow tube 205, or a mandrel connected to the flow tube 205, may form a chamber 220 against an inside of the housing 210. A force-transmitting member 225, which may be a radially extending flange or an extension of the mandrel, divides the chamber 220. A biasing member 230, such as a spring, resides in the chamber 220 between the force-transmitting member 225 and the housing 210. FIGS. 2A and 2B illustrate open and closed positions, respectively, of the subsurface safety valve 200. The subsurface safety valve 200 of this embodiment is opened by pressuring pressure chamber 235 via hydraulic line 240. Connections 245, 250 enable the subsurface safety valve 200 to be included in a tubular string (not shown).

Various components used in the production of subsurface fluids, including the various components of the subsurface safety valve 200 of FIGS. 2A and 2B, are subject to scaling due to immersion in subsurface fluids such as hydrocarbons. These components include apparatuses and system used in the conveyance and refining of subsurface fluids. The coatings of the present disclosure are particularly useful for downhole components, where intervention and cleaning is very costly. As used herein, the term "subsurface component" is defined to include all such components used in the production of subsurface fluids, including, but not limited to, seals and sealing device components; plugs, including frac plugs, shear out plugs, screen basepipe plugs, stim liner plugs, ICD plugs, and the like; screens and basepipes; tubulars, including flow tubes, wash pipes, and the like; couplings and coupling device components; subs, including ESP space out subs; slips; restraints, including dog, springs, collet, and the like; debris barriers; atmospheric chamber discs; swabbing elements; multilateral windows; seal bore protectors; liners; sleeves; mandrels; actuation devices; release devices; screen protectors; whipstocks and whipstock components; centralizers; pins and set screws; flappers; microbial fuel cells and associated components; biasing members; gas generators; muleshoes; mills; cutting structures; packer and zone isolation devices; float shoes; darts; seats; c-rings; teleperf discs; valves, including gas lift valves, safety valves, and the like; perforating gun systems and associated components; and any other associated component used in the production of subsurface fluids.

The advantages of the coating described herein further provide advantages in functionality. Various components of the subsurface safety valve 200 are subject to scaling. For example, scaling may occur in the chamber 220 and on the biasing member 230, interfering with the fail-safe function of these components. These components are exemplary of many others used in the production of subsurface fluids in that the chamber 220 and the biasing member 230 would be difficult to access even during intervention. Thus, the application of the coating described above to one or more of the surfaces of these components preserves the functionality of the subsurface safety valve 200. The coating may further be applied to additional surfaces of the subsurface safety valve 200 as well as any other component where scaling may occur.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. An article having a scale-inhibiting coating, comprising:
   a substrate used in the production of subsurface fluids; and
   a coating applied to at least one surface of the substrate, the coating comprising a diamond-like carbon structure doped with a dopant that comprises fluorine, a combination of silicon and oxygen, or a combination of silicon, oxygen, and fluorine, the coating comprising the dopant at a concentration of between about 10 and about 40 atomic percent, and the coating having an outer surface opposite the substrate and facing the subsurface fluids,
wherein the diamond-like carbon structure contains between about 60 percent and about 90 percent of sp2 bonded carbon.

2. The article of claim 1, wherein the dopant comprises the combination of silicon and oxygen.

3. The article of claim 2, the diamond-like carbon structure comprising the dopant at a concentration of about 30 atomic percent.

4. The article of claim 1, having a thickness of less than or equal to about 15 microns.

5. The article of claim 1, the diamond-like carbon structure having a contact angle hysteresis of less than or equal to about 10 degrees.

6. The article of claim 1, wherein the diamond-like carbon structure is formed using physical vapor deposition, chemical vapor deposition, plasma-enhanced chemical vapor deposition, primary ion beam deposition, or closed field unbalanced magnetron sputtering.

7. The article of claim 1, wherein the surface of the substrate is a metallic surface or a ceramic surface.

8. The article of claim 1, wherein the subsurface fluid is a hydrocarbon or brine.

9. The article of claim 8, the article being a component used in the production of a subsurface fluid, comprising a seal or a sealing device component, a plug, a screen, a tubular, a coupling or coupling device component, a slip, a restraint, a chamber disc, a seal bore protector, a whipstock or a component thereof, a centralizer, a pin or set screw, a flapper, a biasing member, a gas generator, a milling device or associated component, a cutting device or component thereof, a packing or zone isolation device, or a valve.

10. The article of claim 9, wherein the component comprises a subsurface component.

11. An apparatus for production of a subsurface fluid, comprising:
one or more components configured to contact a subsurface fluid; and
a scale-inhibiting coating deposited on one or more surfaces of the one or more components, the coating comprising a diamond-like carbon structure doped with a dopant that comprises fluorine, a combination of silicon and oxygen, or a combination of silicon, oxygen, and fluorine, the coating comprising the dopant at a concentration of between about 10 and about 40 atomic percent, and the coating having an outer surface facing the subsurface fluids,
wherein the diamond-like carbon structure contains between about 60 percent and about 90 percent of sp2 bonded carbon.

12. The apparatus of claim 11, wherein the dopant comprises the combination of silicon and oxygen.

13. The apparatus of claim 11, wherein the coating has a thickness of less than or equal to about 15 microns.

14. The apparatus of claim 11, wherein the component is used in a well.

15. The apparatus of claim 11, wherein the component is a subsurface safety valve, a flow control valve, a production tubing, a biasing member, or a sleeve.

16. The apparatus of claim 11, wherein the subsurface fluid is a hydrocarbon.

17. The article of claim 1, further comprising a bonding layer beneath the diamond like carbon structure and adjacent to the surface of the substrate.

18. The article of claim 17, wherein the bonding layer comprises chromium, silicon, or a combination comprising at least one of the foregoing.

19. The article of claim 1, wherein the surface of the substrate comprises a textured surface, the textured surface comprising a micro texture, a micro-nano texture, or a combination of a micro texture and a micro-nano texture; and the coating is disposed on the textured surface.

20. The article of claim 19, wherein the textured surface is selected such that the hydrophobicity of the coating is increased by greater than 30%, as determined by comparing the contact angle of water with the coating on a surface without any texture and the contact angle of water with the same coating on a surface having the texture.

21. The apparatus of claim 11, further comprising a bonding layer beneath the diamond like carbon structure and adjacent to the one or more surfaces of the one or more components.

22. The apparatus of claim 21, wherein the bonding layer comprises chromium, silicon, or a combination comprising at least one of the foregoing.

23. The apparatus of claim 11, wherein one or more surfaces of the one or more components comprise a textured surface, the textured surface comprising a micro texture, a micro-nano texture, or a combination of a micro texture and a micro-nano texture; and the coating is disposed on the textured surface.

* * * * *